(12) United States Patent
Sugata

(10) Patent No.: US 12,082,104 B2
(45) Date of Patent: Sep. 3, 2024

(54) METHOD, COMMUNICATION SYSTEM, INFORMATION PROCESSING SYSTEM, AND COMPUTER READABLE MEDIUM

(71) Applicant: TOYOTA JIDOSHA KABUSHIKI KAISHA, Toyota (JP)

(72) Inventor: Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 332 days.

(21) Appl. No.: 17/518,180

(22) Filed: Nov. 3, 2021

(65) Prior Publication Data

US 2022/0191780 A1 Jun. 16, 2022

(30) Foreign Application Priority Data

Dec. 10, 2020 (JP) ................... 2020-205173

(51) Int. Cl.
*H04W 48/20* (2009.01)
*H04B 17/318* (2015.01)
*H04W 4/38* (2018.01)

(52) U.S. Cl.
CPC .......... *H04W 48/20* (2013.01); *H04B 17/318* (2015.01); *H04W 4/38* (2018.02)

(58) Field of Classification Search
CPC ....... H04W 48/20; H04W 4/38; H04W 24/08; H04W 36/0058; H04W 36/0085; H04W 36/30; H04W 76/10; H04W 48/00–18; H04W 24/00; H04W 72/00–12; H04W 72/231–232; H04W 72/20–21;
(Continued)

(56) References Cited

U.S. PATENT DOCUMENTS

2008/0119192 A1* 5/2008 Miyata .................. H04W 36/30
455/438
2011/0053494 A1 3/2011 Kobayakawa
(Continued)

FOREIGN PATENT DOCUMENTS

CN 101039526 A 9/2007
CN 102684763 A 9/2012
(Continued)

*Primary Examiner* — Ricky Q Ngo
*Assistant Examiner* — David M Kayal
(74) *Attorney, Agent, or Firm* — Oliff PLC

(57) ABSTRACT

An example of an object of the present disclosure is to provide an information processing system, a communication system, a selection method, and a program for decreasing performance degradation in wireless communication. An embodiment of the present disclosure is an information processing system including an acquisition unit configured to acquire first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between the second hub and the sensor and selection unit configured to select a hub to be connected to the sensor based on the first radio wave strength information and the second radio wave strength information acquired by the acquisition unit.

9 Claims, 16 Drawing Sheets

(58) Field of Classification Search
CPC ....... H04W 72/54; H04W 72/541–543; H04W 76/00; H04W 92/12; H04W 24/02; H04B 17/318

See application file for complete search history.

(56) References Cited

U.S. PATENT DOCUMENTS

| | | | |
|---|---|---|---|
| 2012/0220333 A1 | 8/2012 | Zhu | |
| 2015/0256968 A1 | 9/2015 | Terazaki et al. | |
| 2016/0278007 A1* | 9/2016 | Gokhale | H04W 48/20 |
| 2018/0368193 A1* | 12/2018 | Alipour | H04W 12/04 |
| 2019/0182740 A1* | 6/2019 | Gao | H04W 36/30 |
| 2023/0116304 A1* | 4/2023 | Shimuta | H04W 8/005 |
| | | | 370/329 |

FOREIGN PATENT DOCUMENTS

| | | |
|---|---|---|
| CN | 103874227 A | 6/2014 |
| CN | 109495194 A | 3/2019 |
| EP | 3454615 A1 | 3/2019 |
| JP | 2011-055374 A | 3/2011 |
| JP | 2015-170937 A | 9/2015 |
| JP | 2016-158200 A | 9/2016 |
| JP | 2018-014570 A | 1/2018 |
| JP | 2018-182603 A | 11/2018 |

\* cited by examiner

| LAST UPLOAD TIME | SENSOR TERMINAL | ALLOCATION HUB | CONNECTION ORDER | RSSI |
|---|---|---|---|---|
| 1000000019 | 6 | HUB01 | 1 | -41 |
| 1000000023 | 12 | HUB01 | 2 | -80 |
| 1000000045 | 7 | HUB02 | 1 | -45 |
| 1000000089 | 9 | HUB02 | 2 | -67 |
| 1000000101 | 13 | HUB01 | 3 | -32 |
| 1000000124 | 2 | HUB02 | 3 | -110 |
| 1000000165 | 3 | HUB01 | 4 | -32 |
| 1000000171 | 8 | | | |
| 1000000189 | 1 | HUB03 | 1 | -65 |
| 1000000251 | 10 | HUB01 | 5 | -32 |
| 1000000262 | 11 | HUB01 | 6 | -65 |
| 1000000286 | 4 | HUB02 | 4 | -67 |
| 1000000290 | 14 | HUB03 | 2 | -121 |
| 1000000311 | 5 | HUB01 | 7 | -52 |

Fig. 6

| SENSOR TERMINAL | CONNECTION ORDER |
|---|---|
| 6 | 1 |
| 12 | 2 |
| 13 | 3 |
| 3 | 4 |
| 10 | 5 |
| 11 | 6 |
| 5 | 7 |

Fig. 7A

| SENSOR TERMINAL | CONNECTION ORDER |
|---|---|
| 7 | 1 |
| 9 | 2 |
| 2 | 3 |
| 4 | 4 |

Fig. 7B

| SENSOR TERMINAL | CONNECTION ORDER |
|---|---|
| 1 | 1 |
| 14 | 2 |

Fig. 7C

| LAST UPLOAD TIME | SENSOR TERMINAL | ALLOCATION HUB | CONNECTION ORDER |
|---|---|---|---|
| t1 | S1 | B1 | 1 |
| t2 | S2 | B2 | 2 |
| t3 | S3 | B2 | 3 |
| t4 | S4 | B1 | 2 |
| t5 | S5 | B3 | 4 |

Fig. 11A

| LAST UPLOAD TIME | SENSOR TERMINAL | ALLOCATION HUB | CONNECTION ORDER |
|---|---|---|---|
| t1 | S1 | B1 | 1 |
| t2 | S2 | A | 1 |
| t3 | S3 | B2 | 2 |
| t4 | S4 | B1 | 2 |
| t5 | S5 | A | 2 |

Fig. 11B

METHOD, COMMUNICATION SYSTEM, INFORMATION PROCESSING SYSTEM, AND COMPUTER READABLE MEDIUM

CROSS REFERENCE TO RELATED APPLICATIONS

This application is based upon and claims the benefit of priority from Japanese patent application No. 2020-205173, filed on Dec. 10, 2020, the disclosure of which is incorporated herein in its entirety by reference.

BACKGROUND

The present disclosure relates to a method, a communication system, an information processing system, and a program.

Recently, a technology for controlling connection of wireless communication (e.g. short-range wireless communication) has been developed.

For example, Japanese Unexamined Patent Application Publication No. 2015-170937 discloses a communication system including a peripheral which is a wireless communication device for providing services and a central which is a wireless communication device for utilizing the services. Specifically, in Japanese Unexamined Patent Application Publication No. 2015-170937, a peripheral 200 transmits an advertisement including a connection priority when a central 100 is connected to the peripheral 200, and the central 100 controls transmission of a connection request signal to the peripheral 200 based on the acquired connection priority. The peripheral 200 establishes a connection with the central 100 in response to the connection request signal. The processing so far is intended to avoid simultaneous transmission of connection request signals (interference) from a plurality of specific centrals 100.

SUMMARY

In a system in which a hub for collecting data collects sensing information from a sensor terminal, for example, when the sensor terminal is a wearable sensor terminal (badge) for acquiring utterances of a person or movements of a body, one hub collects information from a plurality of the sensor terminals. Furthermore, when hubs are distributed in a plurality of locations as base stations for collecting information, and data collected by the hubs are uploaded to a central data server (e.g., a cloud), there may be a situation in which a plurality of hubs try to collect information from a certain sensor terminal. In this case, after one hub has acquired data from the sensor terminal, another hub executes a series of session establishment processing from connection to disconnection for the sensor terminal having little data to be transmitted. This session establishment incurs system overhead, thereby degrading overall system performance.

One example of an object of the present disclosure is to solve such a problem, and provide an information processing apparatus (system), a communication system, a selection method, and a program for preventing or minimizing performance degradation in wireless communication.

An example aspect of the present disclosure is an information processing system including: an acquisition unit configured to acquire first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between a second hub and the sensor; and selection unit configured to select a hub to be connected to the sensor based on the first radio wave strength information and the second radio wave strength information acquired by the acquisition unit. Thus, the information processing apparatus can prevent a plurality of hubs from being connected to the same sensor, and thus the performance degradation in wireless communication can be decreased.

Further, in the above information processing apparatus, when either one of the radio wave strength indicated by the first radio wave strength information and the radio wave strength indicated by the second radio wave strength information is a predetermined threshold or higher and another one of the radio wave strength indicated by the first radio wave strength information and the radio wave strength indicated by the second radio wave strength information is less than the predetermined threshold, the selection unit may select a hub for performing wireless communication at the radio wave strength of the predetermined threshold or higher, from between the first hub and the second hub, to be connected to the sensor. Thus, the information processing apparatus can provide wireless communication of high quality by selecting a hub capable of stably performing wireless communication with the sensor.

In the above information processing apparatus, when the radio wave strength indicated by the first radio wave strength information and the radio wave strength indicated by the second radio wave strength information are the predetermined threshold or higher, the selection unit may select a hub with an earlier order of connection to the sensor as the hub to be connected to the sensor from between the first hub and the second hub. By doing so, since the information processing apparatus selects a hub capable of quickly acquiring data from the sensor among hubs capable of stably performing wireless communication with the sensor, the communication quality between the sensor and the hub can be further improved.

The information processing apparatus may further include a notification unit configured to notify the selected hub that the hub is selected as the hub to be connected to the sensor. Thus, the hub which is notified is connected to the sensor based on the notification from the notification unit, and can perform wireless communication.

In the information processing apparatus, the notification unit may notify the hub not selected that the hub is not selected as the hub to be connected to the sensor. In this way, the information processing apparatus can surely prevent the hub not selected from being connected to the sensor.

In the information processing apparatus, the acquisition unit may further acquire third radio wave strength information, the third radio wave strength information being information related to radio wave strength of the sensor in the wireless communication between a third hub and the sensor, and the selection unit may select a hub connected to the sensor based on the acquired first radio wave strength information, the acquired second radio wave strength information, and the acquired third radio wave strength information. Thus, the information processing apparatus can prevent the connection of three or more hubs to the same sensor, and thus the performance degradation in wireless communication can be decreased.

Another example aspect of the present disclosure is a communication system including: a first hub connected to a sensor by wireless communication; a second hub connected to the sensor by wireless communication; and an information processing apparatus connected to the first hub and the second hub. The information processing apparatus includes: an acquisition unit configured to acquire first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between a second hub and the sensor; and selection unit configured to select a hub to be connected to the sensor based on the first radio wave strength information and the second radio wave strength information acquired by the acquisition unit. Thus, the communication system can prevent a plurality of hubs from being connected to the same sensor, and thus the performance degradation in wireless communication can be decreased.

In this example aspect, the communication system may further include the sensor. Thus, a communication system capable of decreasing deterioration in performance in wireless communication can be provided in an extended form including a sensor.

Another example aspect of the present disclosure is a method of selecting a hub including: acquiring first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between a second hub and the sensor; and selecting a hub to be connected to the sensor based on the acquired first radio wave strength information and the acquired second radio wave strength information. It is thus possible to prevent a plurality of hubs from being connected to the same sensor, and thus the performance degradation in wireless communication can be decreased.

Another example aspect of the present disclosure is a program for controlling a computer to execute: acquiring first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between a second hub and the sensor; and selecting a hub to be connected to the sensor based on the acquired first radio wave strength information and the acquired second radio wave strength information. Thus, the computer can prevent a plurality of hubs from being connected to the same sensor, and thus the performance degradation in wireless communication can be decreased.

According to the present disclosure, it is possible to provide an information processing apparatus, a communication system, a selection method, and a program for decreasing performance degradation in wireless communication.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 6 shows an example of an the allocation table according to the first embodiment;

FIG. 7A shows an example of connection target sensor terminal information according to the first embodiment;

FIG. 7B shows an example of the connection target sensor terminal information according to the first embodiment;

FIG. 7C shows an example of the connection target sensor terminal information according to the first embodiment;

FIG. 11A shows an example in which data of the allocation table is extracted according to the first embodiment;

FIG. 11B shows an example of data after allocation processing is applied according to the first embodiment;

DESCRIPTION OF EMBODIMENTS

First Embodiment

Figure 1:
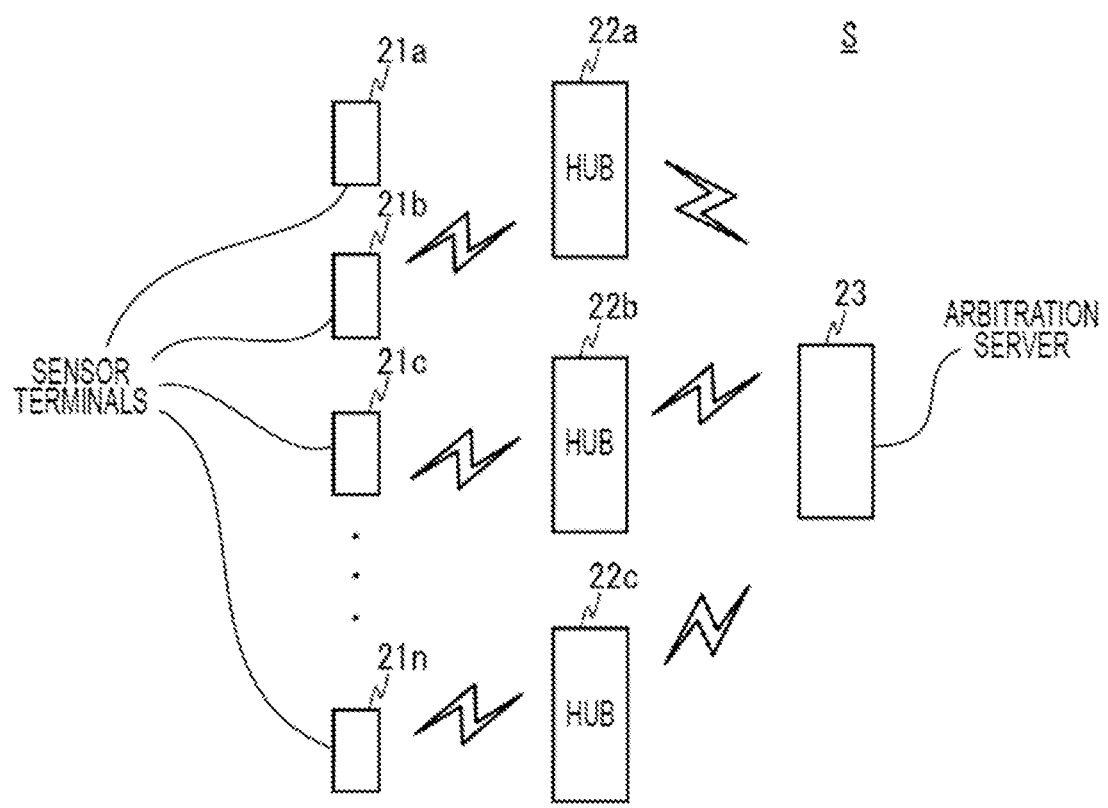
FIG. 1 is a schematic diagram showing an example of a communication system according to a first embodiment.

Embodiments of the present disclosure will be described below with reference to the drawings. FIG. 1 is a schematic diagram of a communication system according to a first embodiment. A communication system S includes sensor terminals 21a, 21b, 21c, . . . , and 21n, hubs 22a, 22b, and 22c, and an arbitration server 23. The sensor terminals 21a, 21b, 21c, . . . , and 21n have the same configuration, and are collectively referred to as the sensor terminals 21 hereinafter. The hubs 22a, 22b, and 22c have the same configuration, and are collectively referred to as the hubs 22 hereinafter. Each element of the communication system S will be described in detail as follows.

Figure 2:
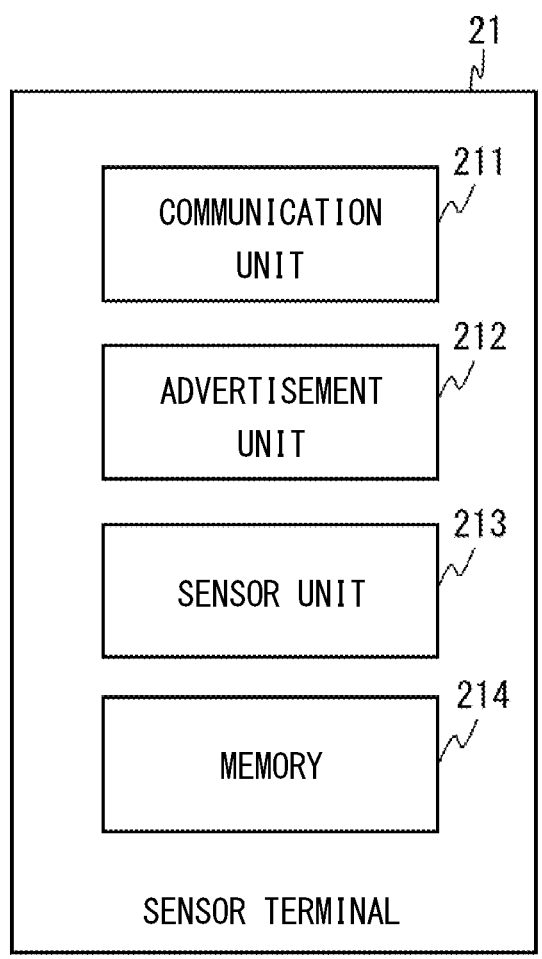
FIG. 2 is a block diagram showing an example of a sensor terminal according to the first embodiment.

FIG. 2 is a block diagram showing the sensor terminal 21. The sensor terminal 21 measures a measurement value which is a predetermined type of physical quantity, and transmits the data of the measurement value to the hub. In this embodiment, although the sensor terminal 21 is a small wearable sensor terminal for acquiring information about utterances of a person or movements of a body, other types of sensor terminals may be used as the sensor terminal 21. In FIG. 1, it is shown that N sensor terminals are provided in the communication system S by distributing one sensor terminal 21 to each of N persons. The sensor terminal 21 includes a communication unit 211, an advertisement unit 212, a sensor unit 213, and a memory 214.

The communication unit 211 is communication means (communication interface) for performing two-way wireless communication with the hub 22. On the other hand, the advertisement unit 212 is communication means (communication interface) for wirelessly transmitting an advertisement signal for notifying the hub 22 of a presence of the sensor terminal 21 itself by broadcast.

The sensor unit 213 is a unit for measuring a measurement value which is a predetermined type of physical quantity. The memory 214 stores the measured measurement values. The stored measurement value is appropriately transmitted to the hub 22 by the communication unit 211. Data of the transmitted measurement value may be deleted from the memory 214.

As a specific configuration example, the communication unit 211 and the advertisement unit 212 may be composed of a BLE (Bluetooth (registered trademark) Low Energy) module as wireless communication means. The advertisement unit 212 composed of the BLE module may periodically (e.g., every 300 ms) transmit an advertisement packet serving as the advertisement signal in accordance with the protocol of BLE, or may transmit the advertisement packet at any timing. The advertisement packet includes a terminal ID for specifying the sensor terminal 21 itself. The terminal ID may be, for example, a MAC (Media Access Control) address. In addition, the sensor unit 213 may include, as an example, a microphone and an acceleration sensor for detecting information about utterances of a person or movements of a body. Audio information and acceleration information measured by the sensor unit 213 are transmitted to the hub 22 by the communication unit 211.

Figure 3:
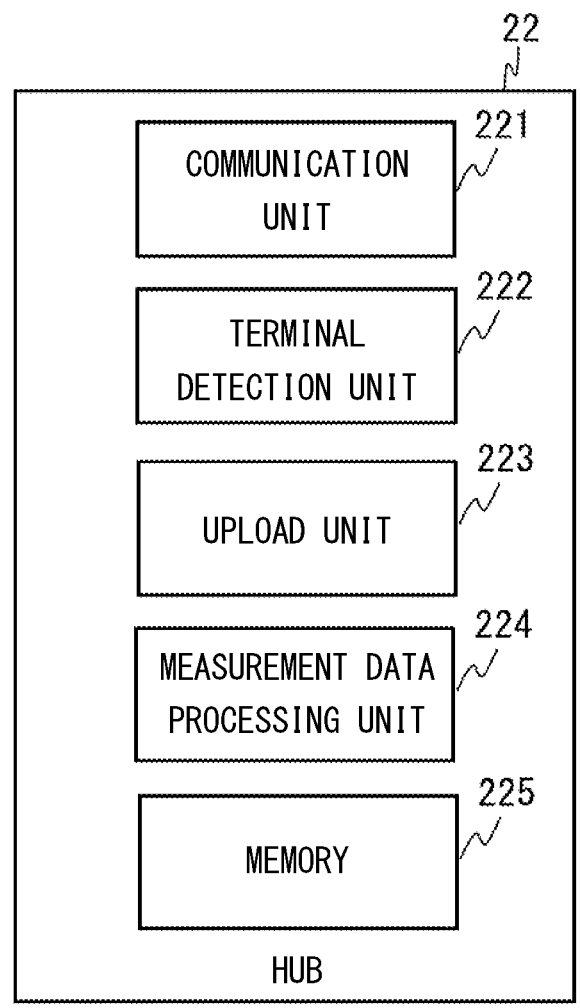
FIG. 3 is a block diagram showing an example of a hub according to the first embodiment.

FIG. 3 is a block diagram of the hub 22. The hub 22 functions as a repeater on a network for collecting the measurement value measured by the sensor terminal 21 and uploading it to the arbitration server 23. The hub 22 includes a communication unit 221, a terminal detection unit 222, an upload unit 223, a measurement data processing unit 224, and a memory 225.

The communication unit 221 is communication means (communication interface) for performing two-way wireless communication with the sensor terminal 21 and the arbitration server 23. On the other hand, the terminal detection unit 222 receives the advertisement signal transmitted from the advertisement unit 212, and based on the received advertisement signal, detects the sensor terminal 21 which is present around the hub 22 and is considered to be capable of wirelessly communicating with the hub 22. Here, the terminal detection unit 222 specifies the sensor terminal 21 using the terminal ID included in the advertisement signal. Furthermore, the terminal detection unit 222 detects a value of radio wave strength of the received advertisement signal, and stores information about the radio wave strength in the hub 22 in association with the terminal ID of the sensor terminal 21 which transmitted the advertisement signal. That is, the radio wave strength is the radio wave strength of the sensor terminal 21 in the wireless communication between the sensor terminal 21 and the hub 22. The terminal detection unit 222 can record the radio wave strength of the advertisement signal for each of the plurality of detected sensor terminals. The radio wave strength depends on at least either, for example, a distance between the sensor terminal 21 and the hub 22 or a radio wave transmission capacity of the hub 22.

The upload unit 223 is communication means (communication interface) for uploading, to the arbitration server 23, list information (a sensor terminal list) of the sensor terminals 21 around the hub including this upload unit 223 and information about the radio wave strength of each of the sensor terminals. The list information about the sensor terminals 21 and the information about the radio wave strength of each of the sensor terminals are detected and stored by the terminal detection unit 222. The upload unit 223 also uploads information about the measurement data acquired by the measurement data processing unit 224 described later to the arbitration server 23. In this embodiment, the upload unit 223 transmits the information to the arbitration server 23 by wireless communication, and instead may transmit the information to the arbitration server 23 through a wire.

The measurement data processing unit 224 is connected to the sensor terminal 21, which is set as a connection target of the hub 22, through the communication unit 221 in accordance with connection target sensor terminal information received from the arbitration server 23 through the communication unit 221. The connection target sensor terminal information indicates the sensor terminal 21 set as the connection target of the hub 22 and an order in which the hub 22 is connected to the set sensor terminal 21. With this information, the measurement data processing unit 224 acquires data of the measurement value from the connected sensor terminal 21. When there are a plurality of sensor terminals set as connection targets of the hub 22, the measurement data processing unit 224 sequentially acquires the measurement values from the plurality of sensor terminals based on the order indicated by the connection target sensor terminal information. The measurement data processing unit 224 also uploads the information about the measurement data to the arbitration server 23 using the upload unit 223. The memory 225 stores not only the terminal ID of the sensor terminal 21 in association with the radio wave strength of the advertisement signal but also the connection target sensor terminal information. The memory 225 may temporarily store data of the measurement value acquired from the sensor terminal 21.

As a specific configuration example, the hub 22 may be a small computer including a BLE module for communicating with the sensor terminal 21. For example, the terminal detection unit 222 periodically (e.g., once every 30 seconds) scans a periphery of the hub 22 using the BLE module in order to detect the advertisement signal of the sensor terminal 21 positioned around the hub 22. The terminal detection unit 222 creates a list of the surrounding detectable sensor terminals 21 based on the detection result, and stores, in the hub 22, the radio wave strength of the advertisement signals received from the respective sensor terminals 21 in association with the list of the sensor terminals 21. The radio wave strength is recorded using, for example, RSSI (Received Signal Strength Indicator). The upload unit 223 is composed of, for example, communication means for connecting to the arbitration server 23, and executes communication in accordance with, for example, a standard such as Wi-Fi (registered trademark) or Ethernet (registered trademark).

Figure 4:
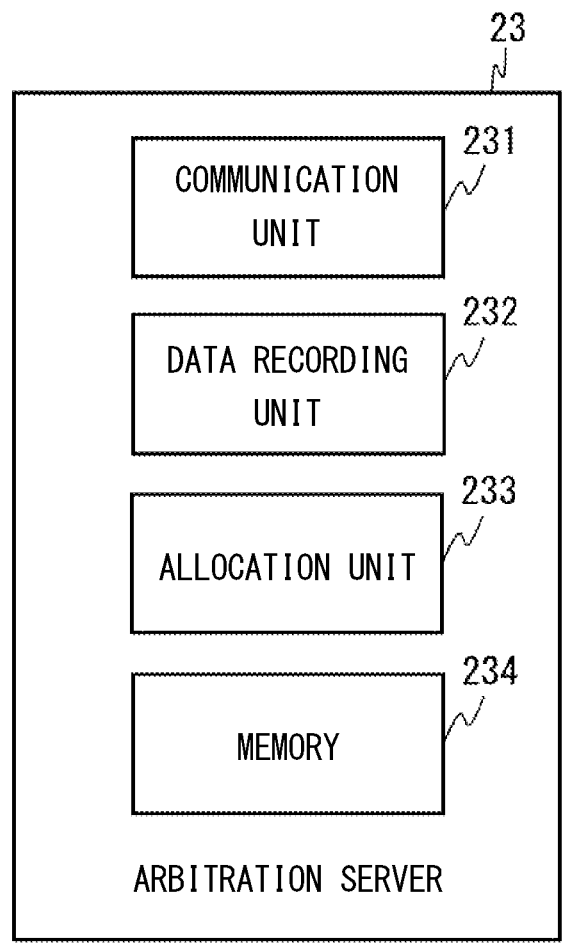
FIG. 4 is a block diagram showing an example of an arbitration server according to the first embodiment.

FIG. 4 is a block diagram showing the arbitration server 23. The arbitration server 23 accumulates the measurement value measured by the sensor terminal 21, and transmits, to each hub 22, information about the sensor terminal 21 to be connected to each hub 22 as the connection target sensor terminal information together with information showing an order of the connection. The arbitration server 23 includes a communication unit 231, a data recording unit 232, an allocation unit 233, and a memory 234.

The communication unit 231 (acquisition unit and notification unit) receives, from the upload unit 223, the list of the sensor terminals 21 detected by the hub 22 and information about the radio wave strength of each sensor terminal 21 (information about the radio wave strength). The communication unit 231 also receives the information about the measurement data transmitted from the upload unit 223. Further, the communication unit 231 transmits the connection target sensor terminal information to each hub 22.

The data recording unit 232 stores a time (a last upload time) when the measurement value of the sensor terminal 21 is last uploaded by each hub 22 in the memory 234 for each sensor terminal 21. Specifically, the data recording unit 232 records the last upload time by updating the last upload time shown in a connection terminal allocation table (hereafter referred to as an allocation table) described later. The data recording unit 232 stores the transmitted measurement value data of the sensor terminal 21 in the memory 234.

The allocation unit 233 (a selection unit) generates the allocation table based on the list of sensor terminals 21 acquired by the arbitration server 23, the last upload time of each sensor terminal 21 recorded by the data recording unit 232, the sensor terminal list reported from each hub 22, and the radio wave strength of the sensor terminal 21. Then, the allocation unit 233 generates the connection target sensor terminal information for each hub 22 based on the allocation table. As described above, the connection target sensor terminal information indicates the sensor terminal 21 set as the connection target of the hub 22 and the order in which the hub 22 is connected to the set sensor terminal 21. Thus, the allocation unit 233 allocates the sensor terminal to which each hub 22 is connected to the corresponding hub 22. After generating the allocation table, the allocation unit 233 updates the allocation table each time the sensor terminal list and the radio wave strength of the sensor terminal 21 are received from each hub 22. Details of this processing will be described later.

The memory 234 stores information about the measurement value data of each sensor terminal 21 and information about the list of sensor terminals 21 acquired from the communication unit 231. The memory 234 also stores information about the allocation table including information about the radio wave strength of the sensor terminal 21, information about the last upload time, and so on. The memory 234 also stores information about a sensor terminal selection diagram used in the allocation unit 233. Details of these pieces of information will be described later.

As a specific configuration example, the arbitration server 23 may be a computer capable of communicating with each hub 22. The arbitration server 23 may be connected to a specific LAN (Local Area Network), for example, in the form of on-premises. Each hub 22 is connected to the arbitration server 23 through a LAN. Alternatively, the arbitration server 23 is installed on a cloud, and the hub 22 may be connected to the arbitration server 23 via the Internet.

Figure 5:
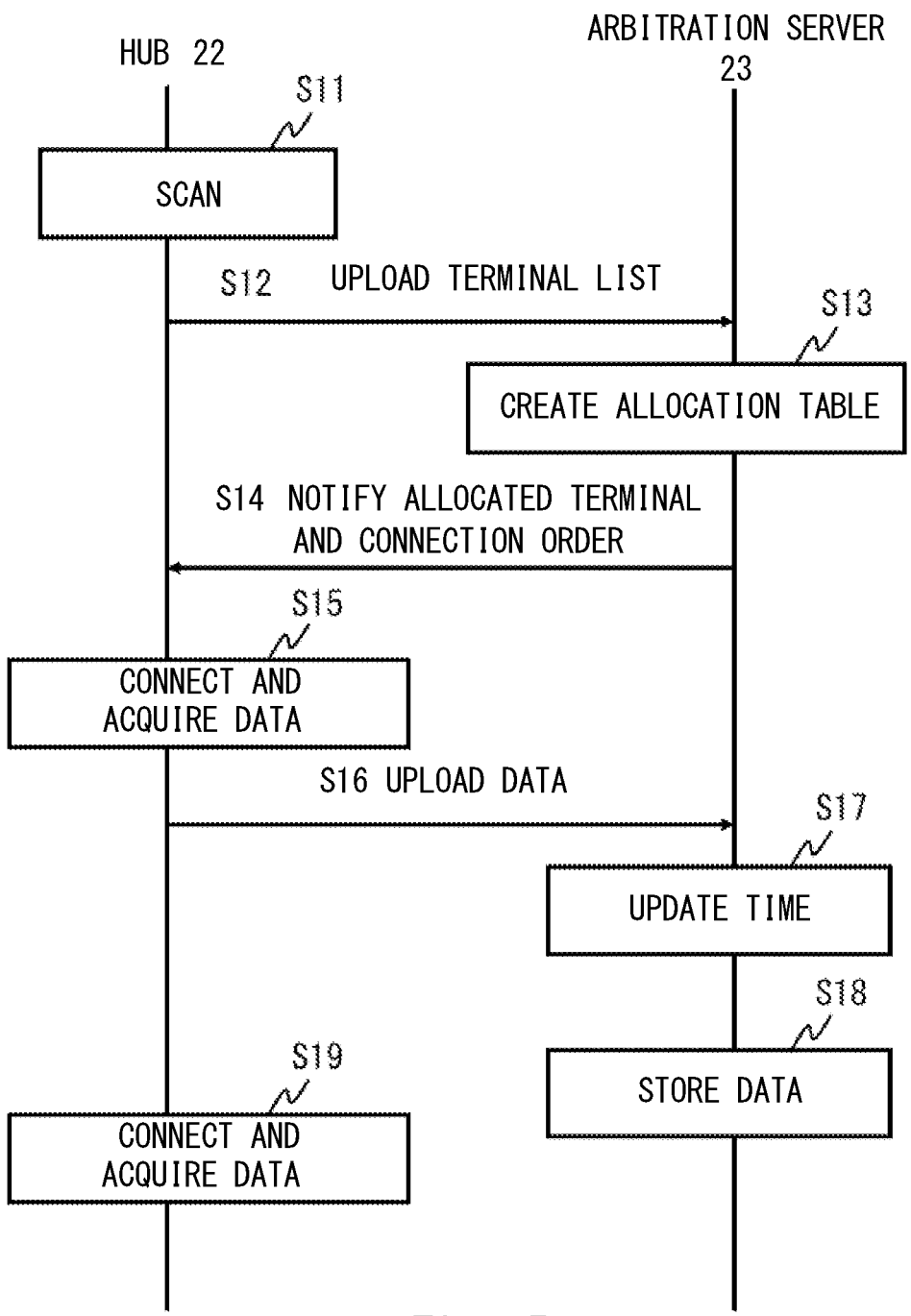
FIG. 5 is a sequence diagram showing an example of processing of the communication system according to the first embodiment.

An example of processing executed by the communication system S will be described below with reference to FIG. 5. FIG. 5 particularly shows processing executed by the hub 22 and the arbitration server 23. Thus, hubs 22a to 22c in FIG. 1 execute the processing of the hub 22 of FIG. 5.

First, the terminal detection unit 222 of the hub 22 detects the advertisement signal of the sensor terminal 21 positioned around the hub 22 by scanning the periphery of the hub 22 (Step S11). The terminal detection unit 222 creates the list of sensor terminals 21 which can be detected in the surroundings based on the detection result, and stores the radio wave strength of the advertisement signals of the sensor terminals 21.

The upload unit 223 uploads the list of the sensor terminals 21 detected by the hub 22 and the information about the radio wave strength of each sensor terminal 21 to the arbitration server 23 (Step S12). The communication unit 231 of the arbitration server 23 receives the information.

The allocation unit 233 creates or updates the allocation table, which is a correspondence table, using the sensor terminal list and the radio wave strength of the sensor terminals 21 reported from the hub 22, which are uploaded in Step S12, and the last upload time of each sensor terminal 21 recorded by the data recording unit 232 (Step S13). The allocation table is stored in the memory 234.

FIG. 6 shows an example of the allocation table. The allocation table shown in FIG. 6 includes, for the respective sensor terminals 21 having the sensor terminal numbers 1 to 14, information about the number of the hub 22 allocated as a connection target, the radio wave strength ("RSSI" in FIG. 6), the order in which the hub 22 is connected to the sensor terminal 21 ("connection order" in FIG. 6), and the last upload time. The sensor terminal numbers 1, 2, 3, ... in FIG. 6 correspond to the sensor terminals 21a, 21b, 21c, and ... in FIG. 1, respectively. Further, "HUB 01", "HUB 02", and "HUB 03" in FIG. 6 correspond to the hubs 22a, 22b, and 22c in FIG. 1, respectively. Details of the allocation table generation processing will be described later.

Referring back to FIG. 5, the description of the processing flow will be continued. The communication unit 231 of the arbitration server 23 transmits, to each hub 22, information indicating the sensor terminal 21 allocated as the connection target and the order of the sensor terminal 21 connected to each hub 22 based on the allocation table (Step S14).

Figure 7C:
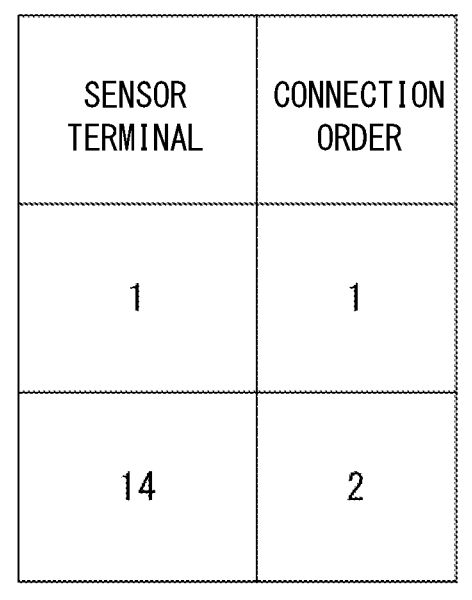

FIGS. 7A to 7C show examples of the connection target sensor terminal information transmitted to the hubs 22a to 22c, respectively, based on the allocation table shown in FIG. 6. The arbitration server 23 transmits, to the hub 22a (HUB01), the information about the sensor terminals 6, 12, 13, 3, 10, 11, and 5 allocated to the HUB01 in FIG. 6, and the information about the order 1, 2, 3, 4, 5, 6, and 7, which is the order in which the HUB01 is connected to the respective sensor terminals, as the information about the table shown in FIG. 7A. The arbitration server 23 transmits, to the hub 22b (HUB02), the information about the sensor terminals 7, 9, 2, and 4 allocated to the HUB01 in FIG. 6 and the information about the order 1, 2, 3, and 4, which is the order in which the HUB02 is connected to the respective sensor terminals, as the information about the table shown in FIG. 7B. The arbitration server 23 also transmits, to the hub 22c (HUB03), the information about the sensor terminals 1 and 14 allocated to the HUB01 in FIG. 6 and the information about the order 1 and 2 which is the order in which the HUB02 is connected to the respective sensor terminals, as the information about the table shown in FIG. 7C. As described above, the information about the allocated sensor terminals 21 and the connection order are transmitted to each hub 22 as the connection target sensor terminal information.

The communication unit 221 of the hub 22 receives the connection target sensor terminal information from the arbitration server 23. The hub 22 is connected to the sensor terminal 21 whose connection order is indicated as "1" in the connection target sensor terminal information, and acquires the measurement value data from the sensor terminal 21 (Step S15). For example, the measurement data processing unit 224 of the hub 22a is wirelessly connected to the sensor terminal 21 having the number 6, and acquires the measurement value data measured by the sensor unit 213 of the sensor terminal 21 based on the table information in FIG.

7A. Similarly, the hub 22b is wirelessly connected to the sensor terminal 21 having the number 7 based on the table information in FIG. 7B, and acquires measurement value data measured by the sensor terminal 21. The hub 22c is wirelessly connected to the sensor terminal 21 having the number 1 based on the table information in FIG. 7C, and acquires the measurement value data measured by the sensor terminal 21.

The hub 22 uploads the measurement value data acquired in Step S15 to the arbitration server 23 using the upload unit 223 (Step S16). The communication unit 231 of the arbitration server 23 receives the data. The data recording unit 232 records the time uploaded in Step S16 as the last upload time for the sensor terminal 21 uploaded in Step S16. Specifically, the "last upload time" for the target sensor terminal 21 in the allocation table shown in FIG. 6 is updated (Step S17).

The data recording unit 232 of the arbitration server 23 stores the transmitted measurement value data of the sensor terminal 21 in the memory 234 (Step S18). Note that, one of timings of the processing in Step S17 and the processing in Step S18 may be before the other one of the timings of the processing in Step S17 and the processing in Step S18, or the timings of the processing in Steps S17 and S18 may be at the same time.

After Step S15, the hub 22 is connected to the sensor terminal 21 whose connection order is indicated as "2" in the acquired connection target sensor terminal information, and acquires the measurement value data from the sensor terminal 21 (Step S19). After acquiring the measurement value data, the hub 22 uploads the data to the arbitration server 23 in the same manner as in Step S16. The hub 22 is similarly connected to the sensor terminals 21 whose connection order is "3" or later in the designated connection order, acquires the measurement value data from the sensor terminals 21, and uploads the data to the arbitration server 23. In this way, when there is the sensor terminal 21 as a connection target, the hub 22 repeats connection to the sensor terminal 21, data extraction, and uploading in accordance with the connection order stored in the memory 225.

Figure 8:
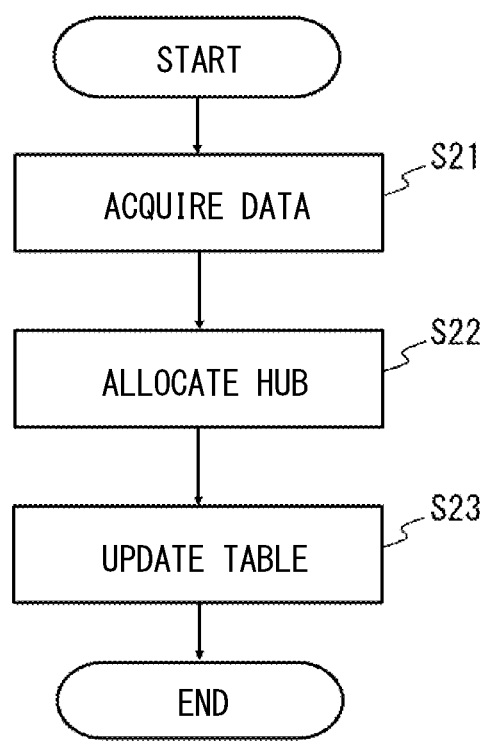
FIG. 8 is a flowchart showing an example of outline of allocation processing executed by an arbitration server according to the first embodiment.

Next, the allocation processing executed by the arbitration server 23 in Step S13 of FIG. 5 will be described in detail. FIG. 8 shows an outline of the allocation processing executed by the arbitration server 23.

First, the communication unit 231 of the arbitration server 23 acquires the sensor terminal list and the data of the radio wave strength of the sensor terminal 21 from a predetermined hub 22 (hereinafter referred to as a hub A) (Step S21).

Next, the allocation unit 233 of the arbitration server 23 allocates one hub 22 to each sensor terminal 21 described in the allocation table using the acquired information (Step S22). Then, the allocation unit 233 updates the allocation table to reflect the allocation result in Step S22 (Step S23).

Specifically, in Step S22, the allocation unit 233 refers to the allocation table in the memory 234, and executes the following processing for each sensor terminal 21 described in the sensor terminal list.

(i) First, when the sensor terminal 21 detected by the hub A is not allocated to another hub in the allocation table, the allocation unit 233 allocates the terminal to the hub A. For example, in the example of FIG. 6, no hub is allocated to the sensor terminal 21 having the number "8". When the sensor terminal 21 with the number "8" is described in the sensor terminal list of the hub A, the allocation unit 233 describes the hub A in the column of "allocation hub" corresponding to the sensor terminal 21 with the number "8" in the allocation table.

(ii) In the allocation table, when the sensor terminal 21 detected by the hub A is already allocated to another hub (hereinafter referred to as a hub B), the allocation unit 233 determines to which one of the hub A and the hub B the sensor terminal 21 is allocated, as follows.

Figure 9:
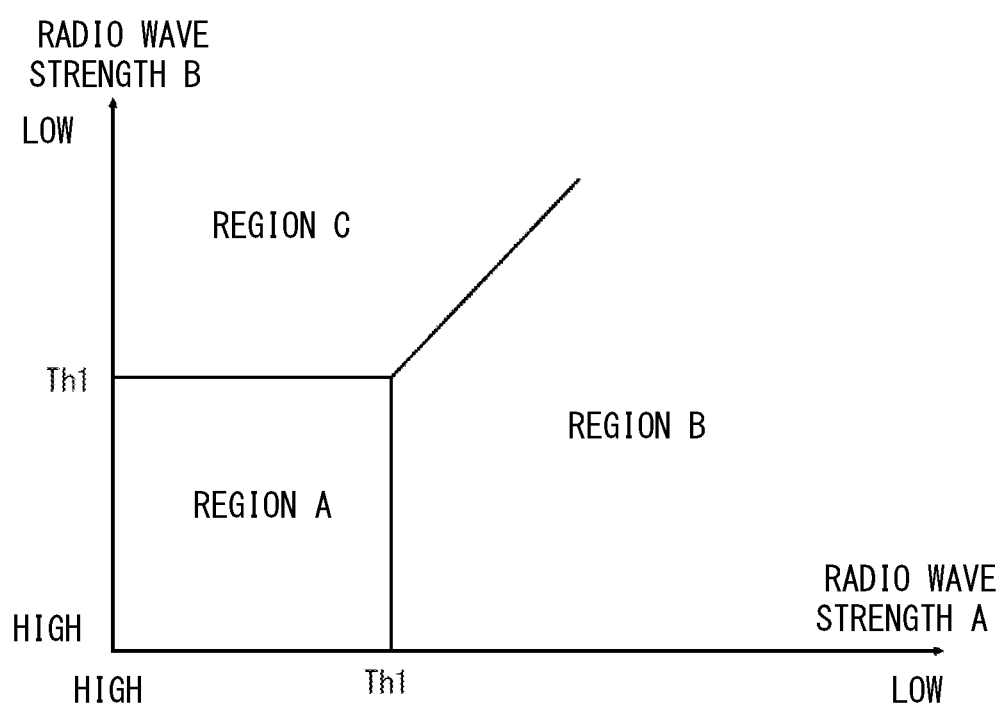
FIG. 9 is a graph showing an example of a sensor terminal selection diagram stored in a memory of an information processing apparatus according to the first embodiment.

FIG. 9 shows an example of a graph of the sensor terminal selection diagram stored in the memory 234. The horizontal axis of the graph in FIG. 9 represents the radio wave strength A (first radio wave strength) in the wireless communication between the sensor terminal 21 for which the allocation hub is to be determined and the hub A. The radio wave strength A is transmitted from the hub A to the arbitration server 23 by the processing in Step S12. The vertical axis of the graph in FIG. 9 represents the radio wave strength B (second radio wave strength) in the wireless communication between the sensor terminal 21 for which the allocation hub is to be determined and the hub B. The radio wave strength B is data transmitted from the hub B to the arbitration server 23 in the past, and is originally described in the allocation table. For example, when the radio wave strength A and B are expressed by RSSI, an origin in the graph of FIG. 9 means that the radio wave strength A and B are both 0. Note that the vertical axis and the horizontal axis in FIG. 9 may be opposite.

A region of FIG. 9 is divided into the following three regions. The three regions are a region A where the radio wave strength A is a predetermined threshold Th1 or higher and the radio wave strength B is the predetermined threshold Th1 or higher, a region B, which is other than the region A, where the radio wave strength A is less than the predetermined threshold Th1 and the radio wave strength B is the radio wave strength A or higher, and a region C other than the regions A and B (i.e., a region other than the region A and is the region C where the radio wave strength B becomes less than the predetermined threshold Th1 and the radio wave strength B becomes less than the radio wave strength A). The predetermined threshold Th1 means a value at which communication from the sensor terminal 21 to the hub 22 can be performed without any problem when the radio wave strength becomes the predetermined threshold Th1 or higher (e.g., a value at which data transmission of the measurement value from the sensor terminal 21 to the hub 22 is possible with a predetermined loss or less).

Figure 10:
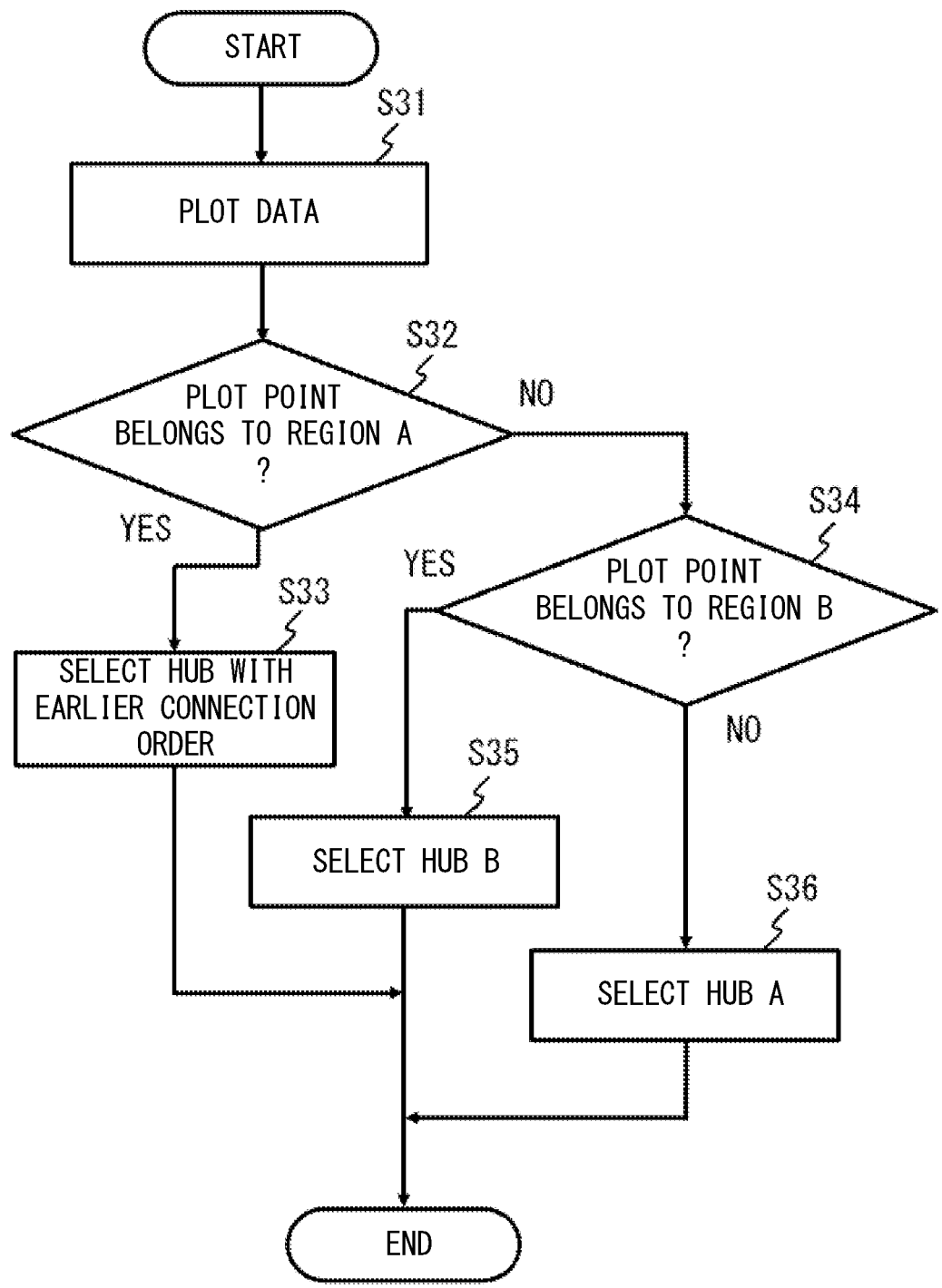
FIG. 10 is a flowchart showing an example of specific processing for selecting a hub to be allocated to a sensor terminal according to the first embodiment.

FIG. 10 shows an example of specific processing in which the allocation unit 233 selects the hub 22 to be allocated to the sensor terminal 21, using the sensor terminal selection diagram.

First, the allocation unit 233 plots, in FIG. 9, a set of the radio wave strength A acquired in Step S12 and the radio wave strength B described in the allocation table (Step S31). Then, the allocation unit 233 determines whether a plot point belongs to the region A (Step S32).

When the plot point belongs to the region A (Yes in Step S32), the allocation unit 233 selects one of the hub A and the hub B which has an earlier order of connection to the target sensor terminal 21 (Step S33). As a specific example, a hub is selected as follows.

The allocation unit 233 extracts, from among the data of the allocation table, data of all the sensor terminals 21, which are described in the sensor terminal list and whose plot points belong to the region A. The extracted sensor terminal 21 may be one or a plurality of sensor terminals. The extracted data is sorted in an ascending order of the last upload times of the respective sensor terminals 21. Note that the last upload time is obtained at the time of data upload processing of each hub 22.

FIG. 11A shows an example in which data of the sensor terminals 21 whose plot points belong to the region A is extracted from the data of the allocation table. FIG. 11A shows the last upload time, allocation hub, and connection order of each of the sensor terminals S1 to S5. The data of the sensor terminal S1 is the last upload time t1, the allocation hub B1, and the connection order 1. The data of the sensor terminal S2 is the last upload time t2 (>t1), the allocation hub B2, and the connection order 2. The data of the sensor terminal S3 is the last upload time t3 (>t2), the allocation hub B2, and the connection order 3. The data of the sensor terminal S4 is the last upload time t4 (>t3), the allocation hub B1, and the connection order 2. The data of the sensor terminal S5 is the last upload time t5 (>t4), the allocation hub B3, and the connection order 4. In this way, the data of FIG. 11A is sorted in an ascending order of the last upload times of the respective sensor terminals.

The allocation unit 233 determines whether the connection order becomes earlier if the hub A is allocated to all the sensor terminals shown in FIG. 11A in place of any of the hubs B1 to B3. First, the allocation unit 233 determines the sensor terminal S1. The allocation unit 233 determines that, for the sensor terminal S1, the connection order does not become earlier even if the hub A is allocated instead of the hub B1, because the connection order of the current allocation hub B1 is "1" and the connection order if the hub A is allocated instead of the hub B1 is "1". Therefore, the allocation unit 233 does not change the hub allocated to the sensor terminal S1, but keeps the hub B1.

Next, the allocation unit 233 determines the sensor terminal S2. The allocation unit 233 determines that, for the sensor terminal S2, the connection order becomes earlier if the hub A is allocated instead of the hub B2, because the connection order of the current allocation hub B2 is "2" and the connection order when the hub A is allocated instead of the hub B2 is "1". Therefore, the allocation unit 233 changes the hub allocated to the sensor terminal S2 from the hub B2 to the hub A.

Next, the allocation unit 233 determines the sensor terminal S3. The allocation unit 233 changes the connection order of the allocation hub B2 from "3" to "2" for the sensor terminal S3 in accordance with the processing of changing the allocation hub of the sensor terminal S2. The allocation unit 233 determines that the connection order does not become earlier even if the hub A is allocated instead of the hub B2, because the connection order when the hub A is allocated instead of the hub B2 becomes "2". Therefore, the allocation unit 233 does not change the hub allocated to the sensor terminal S3, but keeps the hub B2.

Next, the allocation unit 233 determines the sensor terminal S4. Since the connection order of the current allocation hub B1 is "2" and the connection order when the hub A is allocated instead of the hub B1 is "2", the allocation unit 233 determines that the connection order does not become earlier even if the hub A is allocated instead of the hub B1. Therefore, the allocation unit 233 does not change the hub allocated to the sensor terminal S4, but keeps the hub B2.

Lastly, the allocation unit 233 determines the sensor terminal S5. Since the connection order of the current allocation hub B3 is "4" and the connection order when the hub A is allocated instead of the hub B1 is "2", the allocation unit 233 determines that the connection order becomes earlier if the hub A is allocated instead of the hub B3. Therefore, the allocation unit 233 changes the hub allocated to the sensor terminal S2 from the hub B3 to the hub A.

FIG. 11B shows data reflecting the allocation processing of the allocation unit 233 described above. The allocation unit 233 executes the processing of Step S33 of FIG. 10 as described above. After that, the allocation unit 233 updates the allocation table stored in the memory 234 for the allocation hubs changed in Step S33.

Returning to FIG. 10, the processing of the allocation unit 233 will be described below. In Step S32, if the allocation unit 233 determines that the plot point does not belong to the region A (No in Step S32), the allocation unit 233 determines whether or not the plot point belongs to the region B (Step S34).

If the plot point belongs to the region B (Yes in Step S34), the allocation unit 233 selects the hub B (Step S35). That is, the allocation unit 233 does not change the allocation hub of the target sensor terminal, but keeps the allocation hub as it is.

If the plot point does not belong to the region B but belongs to the region C (No in Step S34), the allocation unit 233 selects the hub A (Step S35). That is, the allocation unit 233 changes the allocation hub of the target sensor terminal.

The allocation unit 233 selects one allocation hub for each one of all the sensor terminals 21 included in the sensor terminal list by executing the above processing. The same processing is also executed when the sensor terminal list is transmitted from another hub 22. Thus, each time one hub 22 transmits the sensor terminal list to the arbitration server 23, the allocation unit 233 performs the allocation processing of the hub 22, and updates the allocation table based on a result of the allocation processing. More specifically, for the sensor terminal 21 whose allocation hub is updated in the allocation table, the allocation hub is updated to a newly selected allocation hub. The allocation unit 233 also updates the connection order to be changed in accordance with the update of the allocation hub. In the example of FIG. 11B, the allocation unit 233 updates the allocation table regarding the allocation hubs of the sensor terminals S2 and S5 and the connection order of the sensor terminals S2, S3, and S5. Furthermore, the allocation unit 233 updates the radio wave strength of the sensor terminal 21 to the radio wave strength associated with the sensor terminal 21 to be updated, which is transmitted by the allocation hub after the update in Step S12 of FIG. 5.

When the allocation table is updated, the arbitration server 23 transmits the connection target sensor terminal information about each hub 22 generated based on the updated allocation table to all hubs 22 connected to the arbitration server 23. As described above, in updating the allocation table, not only the hub 22 on which the scan is executed but also the other hubs 22 may change the order of connection to the sensor terminals 21 to be allocated. Therefore, the arbitration server 23 performs a scan right before the connection, and notifies the updated connection target sensor terminal information not only to the hub 22 which uploaded the sensor terminal list to the arbitration server 23 but also to the other hubs 22.

When the hub 22 receives the updated connection target sensor terminal information, the hub 22 updates the connection target sensor terminal information held in the memory 225 in the hub 22. In this way, the sensor terminal 21 to which the hub 22 is connected and the connection order are updated. When there is a sensor terminal 21 as the connection target, the upload unit 223 of the hub 22 repeats connection to the sensor terminal 21, acquisition and upload of the measurement value data in accordance with the connection order stored in the memory 225.

As described above, the arbitration server 23 uses the communication unit 231 to acquire the radio wave strength A, which is the radio wave strength of the sensor terminal 21 in the wireless communication between the hub A (a first hub) and the sensor terminal 21, and the second radio wave strength, which is the radio wave strength of the sensor terminal 21 in the wireless communication between the same sensor terminal 21 and the hub B (a second hub). The allocation unit 233 selects the hub to be connected to the sensor terminal 21 based on the radio wave strength A and the radio wave strength B. This decreases the degradation of the performance in the wireless communication, because the arbitration server 23 can prevent the plurality of hubs A and B from being connected to the same sensor terminal 21.

In a system in which sensing information about wearable sensor terminals is collected by hubs for collecting data, the hubs are usually provided in various places in order to surely collect data from the sensor terminals. In practice, the coverage of the data collection of the hub often overlaps with each other in order to increase the density of the coverage. Therefore, a plurality of hubs accessible to the same sensor terminal are present in the same space, and an event in which right after a specific hub acquires data of a specific sensor terminal, another hub tries to acquire data of the specific sensor terminal may occur. Then, after the data is acquired, the sensor terminal having little data to be transmitted to the hub is subjected to overhead processing related to the session establishment processing from connection to disconnection. For this reason, overall system performance is degraded.

In order to solve such a situation, there may be a method of previously setting a hub to be allocated to the sensor terminal. However, if the communication between the allocation hub and the sensor terminal is unstable, the hub may not be able to obtain data from the sensor terminal. The sensor terminal with unstable communication is, for example, a sensor terminal with weak radio waves to be received by the hub, because the sensor terminal is located far from the hub. Since the sensor terminal is not allocated to any other hub, the sensor terminal is not connected to any hub. According to the present disclosure with the above configuration, the hub is selected in consideration of the radio wave strength, and thus the possibility of connection failure can be reduced when the sensor terminal is connected to the hub. In order to make it possible to select a hub in consideration of the radio wave strength, the allocation table stored by the arbitration server 23 includes information about "RSSI" indicating the radio wave strength.

When either one of the radio wave strength A and the radio wave strength B is the predetermined threshold Th1 or higher and the other is less than the threshold Th1, the allocation unit 233 can select a hub for the wireless communication at the radio wave strength of the threshold Th1 or higher from between the hub A and the hub B as a hub to be connected the sensor terminal 21. By doing so, the arbitration server 23 can provide high quality wireless communication by selecting a hub capable of stably performing wireless communication with the sensor terminal 21.

When the radio wave strength A and the radio wave strength B are the predetermined threshold Th1 or higher, the allocation unit 233 can select a hub in which the order of connection to the sensor terminal 21 becomes earlier from between the hubs A and B as a hub to be connected to the sensor terminal 21. By doing so, the arbitration server 23 selects a hub capable of quickly acquiring data from the sensor terminal 21 from among hubs capable of stably performing wireless communication with the sensor terminal 21, and thus the communication quality between the sensor terminal 21 and the hub 22 can be further improved.

The arbitration server 23 can notify, using the communication unit 231, the hub 22 selected by the allocation unit 233 that this hub 22 is selected as a hub to be connected to the sensor terminal 21. Thus, the hub which is notified is connected to the sensor terminal 21 based on the notification and can perform wireless communication.

Furthermore, the communication unit 231 can also notify the hub 22 that has not been selected by the allocation unit 233 that this hub 22 has not been selected as the hub to be connected to the sensor terminal 21. In this way, the arbitration server 23 can surely prevent the hub 22 not selected from being connected to the sensor terminal 21.

Second to fourth embodiments will be described below as variations of the first embodiment. Note that, in each of the second to fourth embodiments, the description will be omitted for the same matters as those already explained in the first embodiment. The variations described in the embodiments may be combined appropriately.

Second Embodiment

In the second embodiment, variations of the processing in Step S33 of FIG. 10 will be described. In the first embodiment, in Step S33, the allocation unit 233 of the arbitration server 23 selects, for the target sensor terminal 21, the hub A as a new allocation hub when (a) the connection order of the hub A which uploaded the terminal list is earlier than the connection order of the hub B originally described in the allocation table. In the second embodiment, in addition to (a), the allocation unit 233 selects the hub A as a new allocation hub (b) when the connection order of the already allocated hub B is larger than a predetermined number N (e.g., if the connection order of the hub B is late to some extent).

Any value can be set to N. For example, when N is 2, among the sensor terminals 21 already allocated to the hub B in the allocation table, the sensor terminals 21 whose connection order is determined to be up to the second remain allocated to the hub B and are not allocated to other hubs. The connection orders of the sensor terminals 21 to which the hub B is to be connected first and the second are not changed.

When the hub 22 uploads the sensor terminal list, the arbitration server 23 changes the allocation hub and connection order of the sensor terminals 21, and a certain lead time may occur before the changed allocation hub and connection order are notified to each hub 22 in the processing of Step S14 of FIG. 5. In this case, there is a possibility that both the formerly allocated hub B and the newly allocated hub A perform processing to connect to the sensor terminal 21. To this sensor terminal 21, the hub B (which is the hub 22 allocated to the sensor terminal 21 in the original allocation table) is connected earlier than the hub A. However, when the connection order of the already allocated hub B is less than or equal to the predetermined number N, the possibility of such a conflict of connection processing can be reduced by not changing this allocated hub B and its connection order. Note that N can be set to a value in consideration of a possible lead time.

Third Embodiment

In the first embodiment, the arbitration server 23 selects a hub for communicating with a predetermined sensor terminal from among the hub 22 originally set for communicating with the predetermined sensor terminal and the hub 22 which has newly detected that communication with the predetermined sensor terminal is possible. However, the arbitration server 23 may select one hub for communicating with the predetermined sensor terminal from among the three or more hubs 22.

As an example of such a case, it is assumed that the plurality of hubs 22 substantially simultaneously (within a predetermined short period of time) upload the list of the sensor terminals 21 to the arbitration server 23, as shown in Step S12 of FIG. 5. For example, in regard to the allocation of the hub 22 to the predetermined sensor terminal 21, the arbitration server 23 may select one hub from among the three hubs A to C. The hubs A and C (third hubs) have transmitted the sensor terminal list in which the sensor terminal 21 is described, and the hub B is originally allocated to the sensor terminal in the allocation table. In such a case, the arbitration server 23 may select the hub having the highest radio wave strength from among the hub A having the radio wave strength, the hub B having the radio wave strength, and the hub C having the radio wave strength (third radio wave strength). Alternatively, among the three hubs 22, the hub having radio wave strength equal to or greater than a predetermined threshold Thr may be selected. If there are a plurality of hubs 22 having radio wave strength equal to or greater than the predetermined threshold Thr, the hub 22 having the earliest connection order may be selected in the same manner as the processing described in the first embodiment. The variation described in the second embodiment can also be applied to the processing described in the third embodiment. It is needless to say that the above processing can be applied to four or more hubs 22.

Fourth Embodiment

In the first embodiment, the hub 22 receives the advertisement signal of the sensor terminal 21 positioned around the hub 22, and detects the radio wave strength value of the advertisement signal received from each sensor terminal 21. In this manner, the hub 22 acquires the information about the radio wave strength of the sensor terminal 21 in the wireless communication between the hub 22 and the sensor terminal 21. However, the hub 22 may acquire not the value of the radio wave strength itself but the information reflecting the radio wave strength as the information related to the radio wave strength.

As described above, the sensor terminal 21 can transmit the advertisement signal at a predetermined interval (e.g., 300 ms). Here, the hub 22 receives (scans) the advertisement signal transmitted from the sensor terminal 21 in a predetermined interval width (e.g., 1 sec). When the radio wave strength of the sensor terminal 21 in the wireless communication is high, the number of times that the hub 22 receives the advertisement signal during one scan increases, while when the radio wave strength of the sensor terminal 21 is low, the number of times that the hub 22 receives the advertisement signal during one scan decreases. Thus, the number of advertisement signals (which can be) received by the hub 22 from a certain sensor terminal 21 in a predetermined period of time (one or more scans) for detecting the advertisement signals can be regarded as the information reflecting the radio wave strength of the sensor terminal 21.

The terminal detection unit 222 of the hub 22 detects the number of advertisement signals received in the predetermined period of time for each sensor terminal 21 communicable with the hub 22. In order to accurately compare the radio wave strength of each sensor terminal 21, it is desirable that the hub 22 set the same predetermined period of time for detecting the advertisement signals for all the sensor terminals 21. The terminal detection unit 222 stores the information about the number of received advertisement signals in the hub 22 in association with the terminal ID of the sensor terminal 21 which transmitted the advertisement signals. The upload unit 223 uploads the list information about the sensor terminals 21 around the corresponding hub 22 detected and stored by the terminal detection unit 222 and the information about the number of advertisement signals received for each sensor terminal 21 to the arbitration server 23.

The communication unit 231 of the arbitration server 23 receives, from the upload unit 223, the sensor terminal list detected by the hub 22 and information about the number of advertisement signals (information about radio wave strength) received for each sensor terminal 21. The allocation unit 233 generates the allocation table based on the list of sensor terminals 21 acquired by the arbitration server 23, the last upload time of each sensor terminal 21 recorded by the data recording unit 232, and information about the sensor terminal list and the number of received advertisement signals reported from each hub 22. The connection target sensor terminal information is generated for each hub 22 based on the allocation table. The allocation unit 233 updates the allocation table each time the sensor terminal list and the number of received advertisement signals are received from each hub 22 after generating the allocation table. The memory 234 stores information about the allocation table including information about the number of received advertisement signals, information about the last upload time, and the like. The memory 234 also stores information about a sensor terminal selection diagram for plotting the number of received advertisement signals instead of the radio wave strength.

Figure 12:
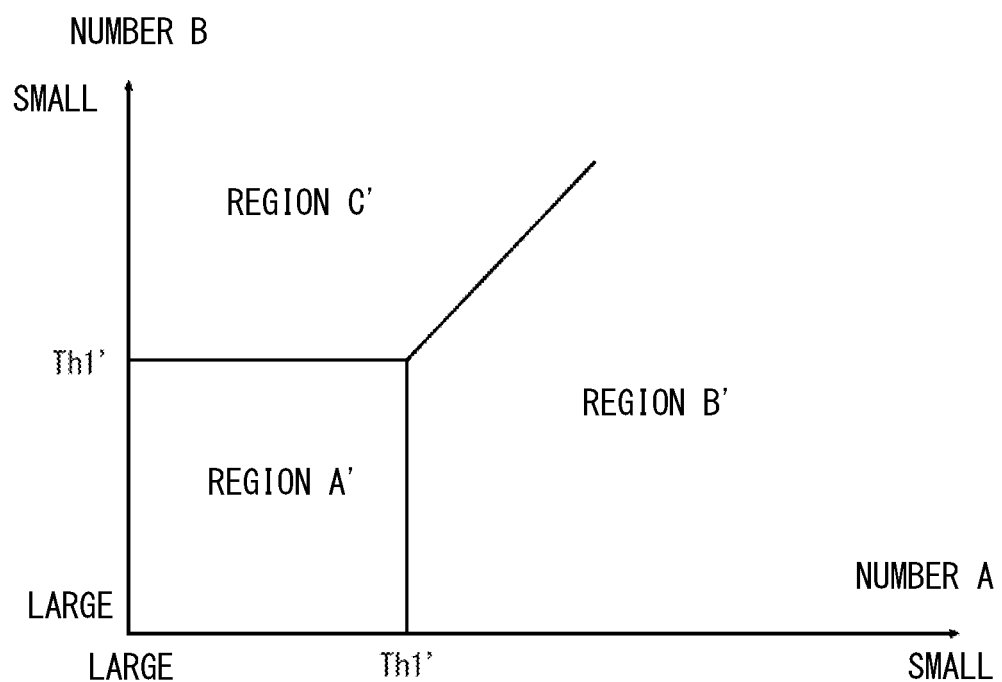
FIG. 12 is a graph showing an example of a sensor terminal selection diagram stored in a memory of an information processing apparatus according to a fourth embodiment.

FIG. 12 is an example of a graph of the sensor terminal selection diagram stored in the memory 234. The horizontal axis of the graph of the sensor terminal selection diagram shows the number A (first radio wave strength information) of advertisement signals received by the hub A in the wireless communication between the sensor terminal 21 for which the allocation is to be determined and the hub A. The vertical axis of the graph of the sensor terminal selection diagram shows the number B (second radio wave strength information) of advertisement signals received by the hub B in the wireless communication between the sensor terminal 21 for which the allocation is to be determined and the hub B. For each of the numbers of times A and B, a threshold Th1' similar to the threshold Th1 in FIG. 9 is set, and regions A', B', and C' similar to the regions A, B, and C, respectively, shown in FIG. 9 are set. That is, the sensor terminal selection diagram is divided into a region A' where the number of times A is a predetermined threshold Th1' or more and the number of times B is the predetermined threshold Th1 or more, a region B', which is other than the region A', where the number of times A is less than the predetermined threshold Th1 and the number of times B is the number of times A or more, and a region C' other than the regions A' and B' (i.e., a region other than the region A' and is the region C' where the number of times B becomes less than the predetermined threshold Th1 and the number of times B becomes less than the number of times A). The predetermined threshold Th1' means a value at which communication from the sensor terminal 21 to the hub 22 can be performed without any problem when the number of received advertisement signals becomes a value the predetermined threshold Th1' or more.

The allocation table generated by the allocation unit 233 includes the number of received advertisement signals instead of "RSSI" in the table shown in FIG. 6. The allocation unit 233 determines a hub to be allocated to each sensor terminal 21 using the magnitude of the number of received advertisement signals instead of the magnitude of the respective radio wave strength. When the sensor terminal 21 detected by the hub A is already allocated to another hub B in the allocation table, the allocation unit 233 plots the number of advertisement signals received by the hub A from the sensor terminal 21 and the number of advertisement signals received by the hub B from the sensor terminal 21 in the sensor terminal selection diagram.

The allocation unit 233 determines whether the plot point belongs to the region A'. When the plot point belongs to the region A', the allocation unit 233 selects one of the hub A and the hub B which has an earlier order of connection to the target sensor terminal 21. Details of this processing is described in the first and second embodiments.

When the allocation unit 233 determines that the plot point does not belong to the region A', the allocation unit 233 determines whether or not the plot point belongs to the region B'. If the plot point belongs to the region B', the allocation unit 233 selects the hub B. That is, the allocation unit 233 does not change the allocation hub of the target sensor terminal, but keeps the allocation hub as it is.

If the plot point belongs to the region C', the allocation unit 233 selects the hub A. That is, the allocation unit 233 changes the allocation hub of the target sensor terminal. As described above, the allocation unit 233 can execute processing similar to the processing shown in FIG. 10. When the sensor terminal 21 detected by the hub A is not allocated to another hub in the allocation table, the allocation unit 233 allocates the terminal to the hub A.

As another example, the arbitration server 23 may estimate a value of the radio wave strength of each sensor terminal 21 communicable with the hub 22 based on the number of received advertisement signals, and execute the processing of the arbitration server 23 according to the first embodiment using the estimated radio wave strength value. The estimated radio wave strength value of each sensor terminal 21 is described in the allocation table. As another example, the hub 22 (not the arbitration server 23) may estimate the value of the radio wave strength of each sensor terminal 21 communicable with the hub 22 based on the number of advertisement signals obtained by the hub 22. The hub 22 transmits the estimated radio wave strength value to the arbitration server 23, and the arbitration server 23 executes the processing of the arbitration server 23 according to the transmitted radio wave strength information described in the first embodiment.

Note that the present disclosure is not limited to the embodiments described above, and may be appropriately modified without departing from the scope thereof. For example, the upload unit 223 may upload the information about the measurement data acquired by the measurement data processing unit 224 to another server instead of the arbitration server 23. The arbitration server 23 acquires the final time of uploading the measurement data to the other server from the other server or the hub 22. In this case, since the arbitration server 23 can be dedicated to the allocation of the terminal sensor to the hub, the allocation processing can be executed quickly. However, in a configuration in which the arbitration server 23 stores the measurement values of the respective sensor terminals 21 uploaded from the respective hubs 22, it is not necessary to transmit the data of the measurement values to other devices, because the arbitration server 23 also has a role as a data server. Furthermore, the number of computers required for the communication system can be reduced.

The division of the regions of FIG. 9 in the first embodiment is not limited to the example described above. For example, the region A may be set to a region where the radio wave strength A is the predetermined threshold Th1 or higher and the radio wave strength B is the predetermined threshold Th1 or higher, the region B may be set to a region other than the region A where the radio wave strength A is less than the predetermined threshold Th1 and the radio wave strength B is less than the radio wave strength A, and the region C may be set to a region other than the regions A and B. In this case, if the radio wave strength A is the same as the radio wave strength B, the allocation unit 233 changes the hub allocated to the target sensor terminal 21 from the hub B to the hub A. However, in the division of the regions B and C described in the first embodiment, when the radio wave strength A is the same as the radio wave strength B, the hub allocated to the target sensor terminal 21 is not changed, so that the update processing executed by the allocation unit 233 can be reduced.

Alternatively, the region A may be a region where the radio wave strength A is the predetermined threshold Th1 or higher and the radio wave strength B is the predetermined threshold Th1 or higher, and a region other than the above region where the radio wave strength A becomes the same as the radio wave strength B, and the region B may be a region other than the region A where the radio wave strength A is less than the predetermined threshold Th1 and the radio wave strength B is less than the radio wave strength A, and the region C may be a region other than the regions A and B. In this case, if the radio wave strength A and B are both less than the threshold Th1 and the radio wave strength A is the same as the radio wave strength B, the allocation unit 233 selects a hub to be allocated to the target sensor terminal 21 based on the connection order. The details are as described in the first and second embodiments.

In the division of the regions of FIG. 9 of the first embodiment, the same threshold is used for the threshold Th1 for dividing the region regarding the radio wave strength A and the threshold Th1 for dividing the region regarding the radio wave strength B, and instead different values may be set for the two thresholds according to the characteristics of the target sensor terminal 21 or the target hub 22. As an example of such a case, it is assumed that when the radio wave strength A is the threshold Th1 or higher, the hub A can perform data communication with the sensor terminal 21 without trouble, while when the radio wave strength B is a threshold Th2 or higher (>Th1), the hub B can perform data communication with the sensor terminal 21 without trouble. In such a case, the region A may be set as a region where the radio wave strength A is the predetermined threshold Th1 or higher and the radio wave strength B is the predetermined threshold Th2 or higher. In this case, the line dividing the region B and the region C may be set to pass through the point (Th1, Th2) of the graph and have a slope of less than 1 (e.g., an extended line connecting the origin and the point (Th1, Th2) on the graph).

In Step S32 of FIG. 10, if it is determined that the plot point belongs to the region A, the hub can be selected in consideration of at least one of the following factors instead of or in addition to the connection order. The factor is, for example, a transmission rate, a delay time, the number of communication interruptions, and the radio wave strength of each of the hubs A and B, which are factors when the measurement value data is transmitted from the target sensor terminal 21 to each of the hubs A and B. The transmission rate may be a maximum transmission rate in one communication, or may be an effective throughput considering the influence of loss and overhead due to error correction. The transmission rate, the delay time, and the number of communication interruptions detected by the hubs A and B are transmitted to the arbitration server 23 so that the arbitration server 23 can acquire them. The sensor terminal 21 detects the radio wave strength of the wireless communication of each of the hubs A and B, transmits the radio wave strength to the hubs A and B, and the hubs A and B further transmit the radio wave strength to the arbitration server 23, so that the arbitration server 23 can acquire the radio wave strength. The variations of the sensor terminal selection diagram and the hub selection processing described above can also be applied to the third and fourth embodiments. For example, in the fourth embodiment, the region A' may be set as a region where the number of times A is equal to or greater than the predetermined threshold Th1' and the number of times B is equal to or greater than the predetermined threshold Th2'.

The arbitration server 23 may be composed of not only one server but also a plurality of distributed servers. Furthermore, any number of the sensor terminals 21 and the hubs 22 can be provided in the communication system S.

In the embodiments described above, the disclosure has been described as a hardware configuration, but the disclosure is not limited to this. This disclosure can also be implemented by causing a processor in a computer to execute a computer program for executing processing of the arbitration server process (steps) described in the above embodiments.

Figure 13:
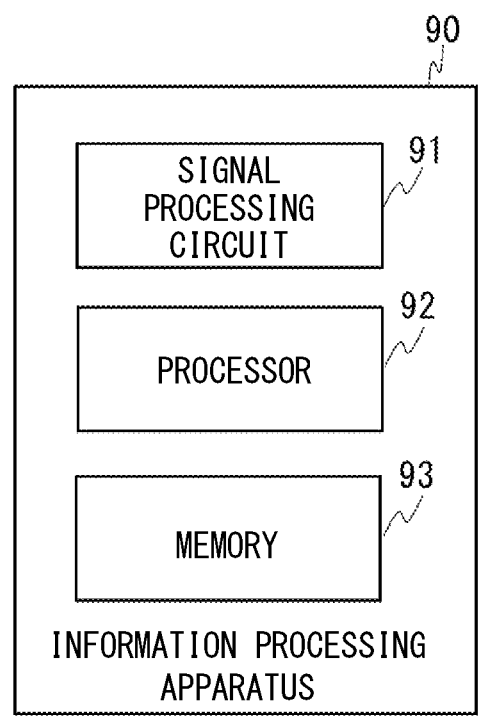
FIG. 13 is a block diagram showing a hardware configuration example of an information processing apparatus according to each embodiment.

FIG. 13 is a block diagram showing an example of a hardware configuration of an information processing apparatus (information processing system) in which the processes of the embodiments described above are executed. Referring to FIG. 13, the information processing apparatus 90 includes a signal processing circuit 91, a processor 92, and a memory 93.

The signal processing circuit 91 is a circuit for processing a signal under the control of the processor 92. The signal processing circuit 91 may include a communication circuit for receiving a signal from the transmitter.

The processor 92 reads and executes software (computer program) from the memory 93 to perform the processing of the apparatus described in the above embodiments. One or more of CPU (Central Processing Unit), MPU (Micro Processing Unit), FPGA (Field-Programmable Gate Array), DSP (Demand-Side Platform) and ASIC (Application Specific Integrated Circuit) may be used as an example of the processor 92. The processor 92 reads software from the memory 93, executes the software, and controls the signal processing circuit 91, so that the signal processing circuit 91 executes functions of respective parts except the memory in each of the sensor terminals 21, the hubs 22, and the arbitration server 23.

The memory 93 may include either a volatile memory or a non-volatile memory, or may be configured in combination of a volatile memory and a non-volatile memory. The memory 93 may include a storage physically separated from the processor 92. In this case, the processor 92 may access the memory 93 via an input/output (I/O) interface (not shown).

In the example of FIG. 13, the memory 93 is used to store software modules. The processor 92 reads these software modules from the memory 93 and executes them to perform the processing described in the above embodiments.

As described above, one or more processors included in each of the devices in the embodiments described above execute one or more programs including instructions for causing the computer to perform the algorithm described with reference to the drawings. By this processing, the signal processing method described in each embodiment can be implemented.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of selecting a hub comprising:
acquiring first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between a second hub and the sensor;
when the radio wave strength indicated by the first radio wave strength information and the radio wave strength indicated by the second radio wave strength information are a predetermined threshold or higher, and a connection order of a hub currently connected to the sensor among the first hub and the second hub is greater than a predetermined value, selecting another hub with an earlier order of connection to the sensor as the hub to be connected to the sensor from between the first hub and the second hub; and
when the radio wave strength indicated by the first radio wave strength information and the radio wave strength indicated by the second radio wave strength information are the predetermined threshold or higher, and the connection order of a hub currently connected to the sensor among the first hub and the second hub is equal to or less than the predetermined value, selecting the hub currently connected to the sensor as the hub to be connected to the sensor from between the first hub and the second hub.

2. The method according to claim 1, further comprising:
when either one of the radio wave strength indicated by the first radio wave strength information and the radio wave strength indicated by the second radio wave strength information is a predetermined threshold or higher and another one of the radio wave strength indicated by the first radio wave strength information and the radio wave strength indicated by the second radio wave strength information is less than the predetermined threshold, selecting a hub for performing wireless communication at the radio wave strength of the predetermined threshold or higher from between the first hub and the second hub to be connected to the sensor.

3. The method according to claim 1, further comprising: notifying the selected hub that the hub is selected as the hub to be connected to the sensor.

4. The method according to claim 3, further comprising: notifying the hub not selected that the hub is not selected as the hub to be connected to the sensor.

5. The method according to claim 1, further comprising:
acquiring third radio wave strength information, the third radio wave strength information being information related to radio wave strength of the sensor in the wireless communication between a third hub and the sensor; and
selecting a hub connected to the sensor based on the acquired first radio wave strength information, the acquired second radio wave strength information, and the acquired third radio wave strength information.

6. A communication system comprising:
a first hub connected to a sensor by wireless communication;
a second hub connected to the sensor by wireless communication; and
an information processing apparatus connected to the first hub and the second hub, wherein
the information processing apparatus comprises:
an acquisition unit configured to acquire first radio wave strength information and second radio wave strength information, the first radio wave strength information being information related to radio wave strength of the sensor in wireless communication between the first hub and the sensor, and the second radio wave strength information being information related to radio wave strength of the sensor in wireless communication between the second hub and the sensor; and
a selection unit configured to select a hub to be connected to the sensor based on the first radio wave strength information and the second radio wave strength information acquired by the acquisition unit, wherein
when the radio wave strength indicated by the first radio wave strength information and the radio wave strength indicated by the second radio wave strength information are a predetermined threshold or higher, and a connection order of a hub currently connected to the sensor among the first hub and the second hub is greater than a predetermined value, the selection unit selects another hub with an earlier order of connection to the sensor as the hub to be connected to the sensor from between the first hub and the second hub; and
when the radio wave strength indicated by the first radio wave strength information and the radio wave strength indicated by the second radio wave strength information are the predetermined threshold or higher, and the connection order of a hub currently connected to the sensor among the first hub and the second hub is equal to or less than the predetermined value, the selection unit selects the hub currently connected to the sensor as the hub to be connected to the sensor from between the first hub and the second hub.

7. The communication system according to claim 6, further comprising:
the sensor.

8. An information processing system comprising:
an acquisition unit configured to acquire first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between a second hub and the sensor; and
a selection unit configured to select a hub to be connected to the sensor based on the first radio wave strength information and the second radio wave strength information acquired by the acquisition unit, wherein
when the radio wave strength indicated by the first radio wave strength information and the radio wave strength indicated by the second radio wave strength information are a predetermined threshold or higher, and a connection order of a hub currently connected to the sensor among the first hub and the second hub is greater than a predetermined value, the selection unit selects another hub with an earlier order of connection to the sensor as the hub to be connected to the sensor from between the first hub and the second hub; and
when the radio wave strength indicated by the first radio wave strength information and the radio wave strength indicated by the second radio wave strength information are the predetermined threshold or higher, and the connection order of a hub currently connected to the sensor among the first hub and the second hub is equal to or less than the predetermined value, the selection unit selects the hub currently connected to the sensor as the hub to be connected to the sensor from between the first hub and the second hub.

9. A non-transitory computer readable medium storing a program for controlling a computer to execute:
acquiring first radio wave strength information and second radio wave strength information, the first radio wave strength information being information related to radio wave strength of a sensor in wireless communication between a first hub and the sensor, and the second radio wave strength information being information related to radio wave strength of the sensor in wireless communication between a second hub and the sensor; and
selecting a hub to be connected to the sensor based on the acquired first radio wave strength information and the acquired second radio wave strength information, wherein
when the radio wave strength indicated by the first radio wave strength information and the radio wave strength indicated by the second radio wave strength information are a predetermined threshold or higher, and a connection order of a hub currently connected to the sensor among the first hub and the second hub is greater than a predetermined value, selecting another hub with an earlier order of connection to the sensor as the hub to be connected to the sensor from between the first hub and the second hub; and
when the radio wave strength indicated by the first radio wave strength information and the radio wave strength indicated by the second radio wave strength information are the predetermined threshold or higher, and the connection order of a hub currently connected to the sensor among the first hub and the second hub is equal to or less than the predetermined value, selecting the hub currently connected to the sensor as the hub to be connected to the sensor from between the first hub and the second hub.

* * * * *